G. PETRICH.
LOADING AND UNLOADING DEVICE.
APPLICATION FILED JULY 6, 1915.
1,175,080.
Patented Mar. 14, 1916.
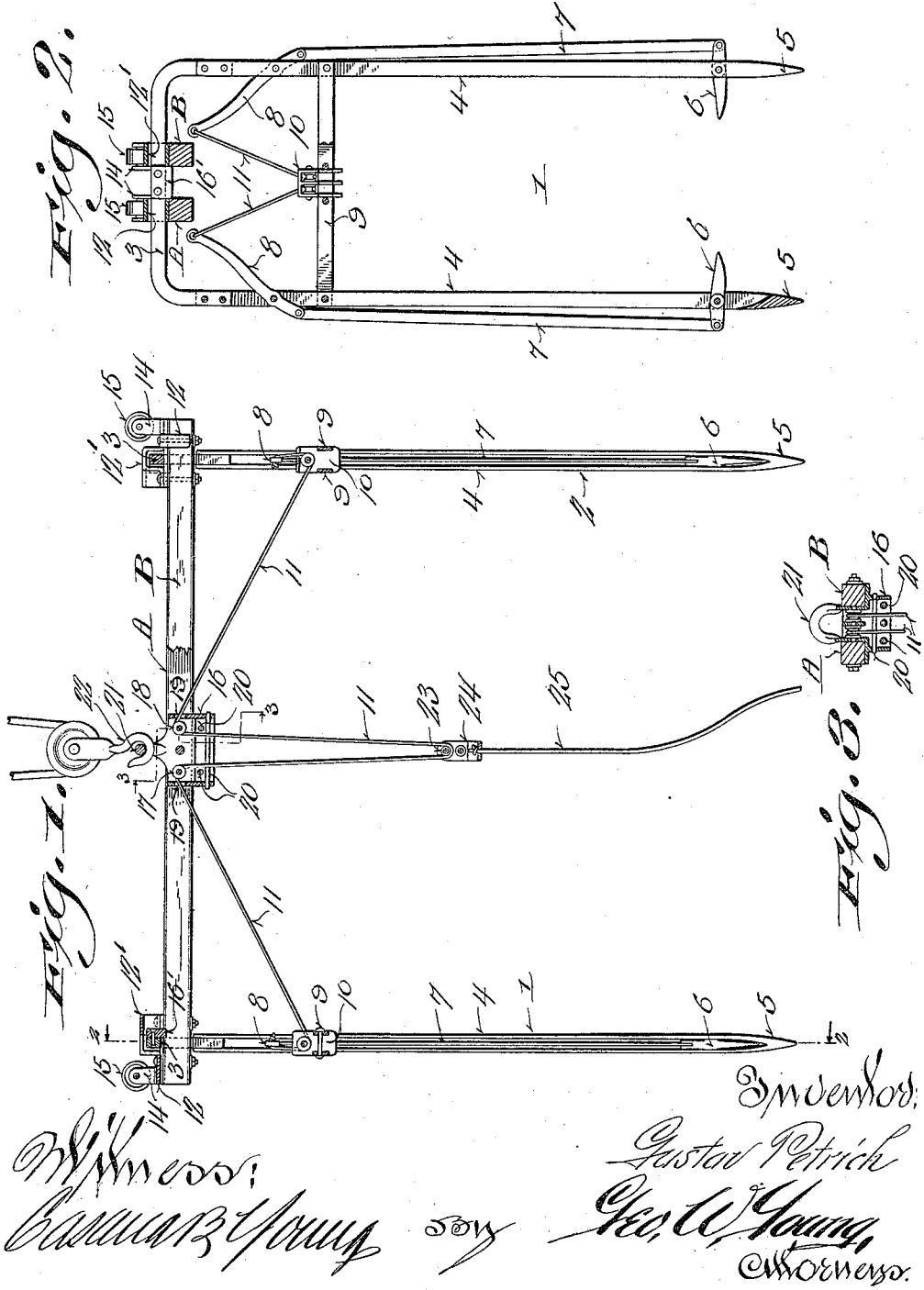

UNITED STATES PATENT OFFICE.

GUSTAV PETRICH, OF WESTFIELD, WISCONSIN.

LOADING AND UNLOADING DEVICE.

1,175,080.  Specification of Letters Patent.  Patented Mar. 14, 1916.

Application filed July 6, 1915. Serial No. 38,214.

*To all whom it may concern:*

Be it known that I, GUSTAV PETRICH, a citizen of the United States, and resident of Westfield, in the county of Marquette and State of Wisconsin, have invented certain new and useful Improvements in Loading and Unloading Devices; and I do hereby declare that the following is a full, clear, and exact description thereof.

This invention relates to the subject of loading and unloading material, such as hay and the like, and has particular relation to forks, grapples and like tools that are used in connection with hoisting and conveying means whereby the material is rapidly and expeditiously transferred from one place to another.

The primary aim of the invention is to produce a grapple that can be easily operated, is simple in structure, and which will transport the maximum of loads.

With the foregoing and other objects in view, the invention contemplates the production of a grapple that will grasp a load at four distinct points and firmly hold the load while being raised or lowered and conveyed to a distant point, means being provided whereby the holding portions of the grapple are simultaneously released from the load, such means being of a nature that they can be operated by a single cable.

In producing a grapple capable of performing the functions generally stated above, it will be readily understood that the same is susceptible of a wide range of changes in so far as details of parts and structural arrangements are concerned, but for purposes of illustration a simple and thoroughly practical embodiment of the invention has been shown in the accompanying drawings, wherein—

Figure 1 is a view in front elevation of a grapple constructed in accordance with the principle of this invention, the view being partly in vertical longitudinal section. Fig. 2 is a central transverse sectional view taken on the line 2—2, Fig. 1. Fig. 3 is a detail sectional view taken on the line 3—3, Fig. 1.

The improved grapple comprises in its general organization two separate fork members, designated generally by the numeral 1 and 2, the fork members being duplicates and each consisting of the inverted U-shaped upper bar 3 the pendent ends of which are bolted, riveted, or otherwise firmly fastened to the upper portions of the vertical shanks 4 of the load-penetrating bars, said bars terminating at their lower ends in the impalement points 5. The shanks 4 may be cast or otherwise formed to produce the spaced parallel members which merge into the impalement points 5, the upper portions thereof being in spaced relation for the reception of the pendent ends of the upper bar 3, said pendent ends also subserving the function of retaining the members of the shanks in spaced relation as will be apparent. Each shank, adjacent its impalement point is equipped with a dog 6, that is preferably pointed, the dog being pivotally mounted between the members of the shank and has a link connection 7 with a lever 8, pivotally mounted between the members of the shank adjacent the upper end of said shank. An upper brace bar 9 connects the shanks of each fork member, the brace bar being equipped with a sheave housing 10 through which the lever-operating cables 11 pass.

The forks 1 and 2 are carried by the supporting bars A and B, the bars A and B being retained in spaced parallel relation by the end shackles 12, each shackle being equipped with an upstanding loop-shaped housing 12′ through which the connector bars 3 of the forks extend, and also with upstanding ears 14 in which rollers 15 are mounted. Preferably the connector bars 3 of the forks are equipped with centrally located lugs 16′ that lie between the bars A and B and to a certain extent prevent movement of the forks relative to said bars A and B. Centrally, the bars A and B carry a housing 16 having sheaves 17 and 18 for the cables of the forks, the housing being provided with side openings 19 through which the cables extend and in its lower portion being provided with transverse and longitudinal rods 20 which separate and guide the respective cables to their sheaves. The upper portion of the housing 16 is provided with an upstanding eye 21 adapted to be engaged by the hook 22, or other attaching medium that depends from an overhead hoisting and conveying device, not shown.

The cables 11 of the levers 8, after passing over the sheaves 10, extend to and pass over the sheaves 17 and 18 of the supporting bars A and B, such cables being properly spaced by the rods 20 of housing 16, and depend from said housing and pass over the sheaves 23 in a housing 24, said housing 24 having a depending cable 25 adapted to be manipulated by the user of the load handling device to cause the levers 8 to throw the dogs 6 into load releasing positions.

In operation the fork members 1 and 2 are forced into the material, it being understood that the dogs 6 are in inoperative positions, through links 7, levers 8, cables 11, and the cable 25, the dogs 6 in their inoperative positions being disposed between the members of the shanks of the forks. When the shanks have penetrated the load, the restraining pressure on the dogs 6 is released, by relieving the strain on the cable 25, whereupon the dogs 6 rock to the positions shown in Fig. 2 of the drawings, that is, at substantially right angles. This rocking of the arm 6 is due to the weight of the connecting links 7, which are pivoted thereto, although in other embodiments of the invention for manipulating material which is difficult of penetration, a more positive means might be employed to rock the dogs to the shanks, and thereby form base supports for the load. When the load has arrived at its destination, a downward pull on cable 25 removes the dogs from their supporting positions, thereby freeing the load. The rollers 15 carried by the supporting bars are of special utility in connection with overhead conveyers in which tracks or the like form a part as said rollers by engaging said tracks prevent the load swaying, as well as facilitating the movements of the load in many other ways.

From the foregoing description it will be clear that the load handling device is one that is simple in operation, compact in structure and is of such a nature that the load is firmly supported at four distinct points, the supporting means being such that they can be readily operated by means of the single cable 25, to release the load.

I claim as my invention:—

A loading and unloading device comprising a pair of spaced parallel supporting bars, shackles engaging the ends of the bars and provided with fork housings and with upstanding conveyer-engaging rollers, hoist engaging means centrally located on the bars, and load-engaging fork members extending through the housings of the shackles.

In testimony that I claim the foregoing I have hereunto set my hand at Westfield, in the county of Marquette and State of Wisconsin, in the presence of two witnesses.

GUSTAV PETRICH.

Witnesses:
KENNETH G. SHELP,
WILLIAM F. WALDENMEYER.

Copies of this patent may be obtained for five cents each, by addressing the "Commissioner of Patents, Washington, D. C."